United States Patent Office 3,355,395
Patented Nov. 28, 1967

3,355,395
ANTIFOAM COMPOSITION AND METHOD OF REDUCING AND PREVENTING FOAMING IN AQUEOUS SYSTEMS
Richard W. Awe, Daniel R. Pail, and Gordon L. Axon, Midland, Mich., assignors to Dow Corning Corporation, Midland, Mich., a corporation of Michigan
No Drawing. Filed Mar. 27, 1964, Ser. No. 355,490
17 Claims. (Cl. 252—321)

This application is a continuation-in-part of abandoned application Ser. No. 154,814, filed Nov. 24, 1961.

This invention is concerned with antifoam compositions capable of reducing or preventing foaming in aqueous systems.

It is an object of this invention to provide improved compositions for reducing and preventing foaming in aqueous systems.

The above object is satisfied by an antifoam composition comprising an intimate admixture of (1) a sulfur-containing siloxane copolymer containing an average of from 1.75 to 2.1 organic radicals per silicon atom, said copolymer consisting essentially of (A) from 0.04 to 3.0 mol percent units of the formula

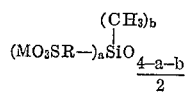

wherein M is selected from the group consisting of $NH_4^+$ ions, alkali metal and hydrogen atoms, R is a divalent hydrocarbon radical selected from the group consisting of alkylene radicals containing from 2 to 30 inclusive carbon atoms, cycloalkylene radicals containing from 4 to 18 inclusive carbon atoms and aralkylene radicals containing from 7 to 18 inclusive carbon atoms, wherein the sulfur atom is attached to the carbon atom in R which is at least the second carbon atom away from the silicon atom, $a$ has an average value of from 1 to 3 inclusive, $b$ has an average value of from 0 to 2 inclusive and the total average value of $a+b$ is from 1 to 3 inclusive, and (B) from 97.0 to 99.96 mol percent siloxane units of the formula

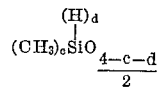

wherein $c$ has an average value of from 1 to 2.1 inclusive, $d$ has an average value of from 0 to 1 inclusive and the total value of $c+d$ is from 1.75 to 2.1 inclusive and (2) a finely divided filler selected from the group consisting of silica and carbon black, there being, based on the total weight of the composition, from 90 to 99 percent by weight of (1) and from 1 to 10 percent by weight of (2).

The sulfur-containing siloxane copolymer contains an average of from 1.75 to 2.1 organic radicals per silicon atom. The sulfur-containing copolymer contains from 0.04 to 3.0 mol percent units of the formula

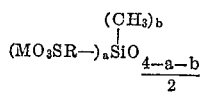

wherein M is an $NH_4^+$ ion; alkali metal atom, such as lithium, sodium, potassium and cesium atoms; and hydrogen atom. R is a divalent hydrocarbon radical selected from the group consisting of alkylene radicals containing from 2 to 30 inclusive carbon atoms, cycloalkylene radicals containing from 4 to 18 inclusive carbon atoms and aralkylene radicals of from 7 to 18 inclusive carbon atoms. Illustrative of alkylene radicals that R represents are $-CH_2CH_2CH_2-$, $-CH_2CH(CH_3)CH_2-$, $-CH_2CH(CH_2CH_3)CH_2-$, $-CH_2(CH_2)_4CH_2-$ $-CH_2(CH_2)_8CH_2-$ and $-CH_2(CH_2)_{28}CH_2-$. Illustrative of the cycloalkylene radicals that R represents are

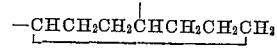

and $$-CHCH_2CH_2CHCH_2CH_2CH_3$$

Preferably R is an alkylene radical of from 3 to 18 carbon atoms. The sulfur atom is attached to a carbon atom in the alkylene or cycloalkylene radical which is at least the second carbon atom away from the silicon atom. Illustrative of the aralkylene radicals that R represents are $$-C_6H_4CH_2CH_2-, \quad -C_6H_4(CH_2)_6-$$

and $-C_{10}H_6C_2H_4-$. There is an average of from 1 to 3 sulfur-containing radicals per silicon atom and from 0 to 2 $CH_3$ radicals per silicon atom. There is a total average of from 1 to 3 total $MO_3SR-+CH_3$ radicals per silicon atom.

The sulfur-containing siloxanes where R is either an alkylene or cycloalkylene radical are disclosed in the copending application of John W. Ryan, entitled "Sulfur-Containing Organosilicon Compounds," which is application No. 154,811, filed November 24, 1961, now U.S. Patent 3,215,718. Methods for making these sulfoalkyl- and sulfocycloalkylsiloxanes are disclosed in that application. In general, these siloxanes are prepared by oxidizing either a siloxane thiuronium salt or thiocyanoalkyl- or thiocyanocycloalkylsiloxane. Salts of these sulfoalkyl- and sulfocycloalkylsiloxanes are prepared by the reaction of a sulfoalkyl- or sulfocycloalkylsiloxane with a base such as sodium hydroxide, potassium hydroxide, ammonium hydroxide or the like or by treatment with ammonia. These methods of preparation are described in detail in Ryan's copending application.

The sulfoaralkylenesiloxanes that are useful in this invention are disclosed in U.S. Patent 2,968,643 (Bailey) which is hereby incorporated by reference. Methods for preparing these siloxanes are also disclosed in the Bailey patent. One satisfactory method for preparing these sulfoaralkylenesiloxanes is to sulfonate an aralkylenesiloxane with a sulfonating agent such as fuming sulfuric acid or sulfur trioxide. This and other methods for preparing these sulfoaralkylenesiloxanes are described in detail in the Bailey patent. Salts of these sulfoaralkylenesiloxanes are prepared by the reaction of a base with a sulfoaralkylenesiloxanes as described above.

These sulfur-containing siloxanes are copolymerized with a siloxane having the unit formula

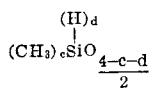

wherein $c$ has an average value of from 1 to 2.1 inclusive, $d$ has an average value of from 0 to 1 inclusive and the total value of $c+d$ is from 1.75 to 2.1 inclusive. As indicated above, the copolymer contains an average of from 1.75 to 2.1 organic radicals per silicon atom. Preferably there are from 1.95 to 2.05 total organic groups per silicon atom. Compositions of improved antifoaming qualities are only obtained when the sulfur-containing siloxane copolymer consists of from 0.04 to 3.0 mol percent of either the sulfoaralkylene- or sulfoalkylsiloxane units and from 97.0 to 99.96 mol percent of the methylsiloxane units. Best results are obtained when the sulfoaralkylene- or sulfoalkylsiloxane units are present in an amount from .4 to 2.1 mol percent. Best results are obtained when $c$ has an average value of 2 and the siloxane is endblocked with trimethylsilyl units. It should be pointed out, however, that it is not essential that the siloxane be so endblocked. In fact, the siloxane can be endblocked with hydroxy groups.

Methods for preparing these sulfur-containing siloxane copolymers are described in the Ryan application. In general, these copolymers are prepared by mixing and heating the methylsiloxane and the sulfoalkyl- or sulfocycloalkylsiloxane together. These copolymers are also prepared by mixing and heating a sulfoalkyl- or sulfocycloalkylsiloxane and a conventional cyclic dimethylsiloxane. Salts of these sulfoalkyl- and sulfocycloalkylsiloxanes can be prepared either before or after copolymerization by reaction of sulfoalkyl- or sulfocycloalkylsiloxane with a base, as described above. The copolymers containing sulfoalkylenesiloxane units are prepared by the same method.

The antifoam composition of this invention must contain from 1 to 10 percent, based upon the total weight of the composition, of a finely divided silica or carbon black filler. The finely divided silica filler can be, for example, silica, aerogel, fume silica and precipitated silica. Treated 863,846 can also be used. The untreated finely divided silicas are well known in the art and are particularly described in, for example, U.S. Patent 2,541,137. Finely divided carbon black is also a suitable filler for this antifoam composition. The best results are obtained with untreated finely divided silica in an amount from 2 to 6 percent by weight.

This antifoam composition is prepared by intimately admixing the sulfur-containing siloxane copolymer and the finely divided filler. This can be accomplished in a mechanical mixer or by any other suitable means.

Although good results are obtained when only an admixture of the copolymer and filler are used, better results are obtained when the filler and copolymer are mixed with a methylpolysiloxane fluid. From 10 to 98 percent by weight (based upon the weight of the total composition) of the methylpolysiloxane fluid can be mixed with from 1 to 80 percent by weight of the siloxane copolymer and from 1 to 10 percent by weight of a finely divided filler. Although best results are obtained when methylpolysiloxane fluid is included in the composition, it should be pointed out that this fluid is an optional ingredient. The best results are obtained when from 2 to 70 percent by weight of the siloxane copolymer is mixed with from 2 to 6 parts by weight of filler and from 28 to 96 parts by weight of methylpolysiloxane fluid. However, good results are obtained as long as the broader limitations set forth above are not exceeded. For most purposes, the ammonium salts of sulfopropylsiloxanes are preferred.

These antifoam compoistions can also contain additives such as pigments, rust inhibitors and antioxidants.

The antifoam compositions of this invention are used merely by adding the composition to any foaming aqueous system. These compositions both destroy existing foam (defoamers) and prevent the building up of foam (antifoamers). The amount of the composition required for preventing and reducing foaming varies, of course, with the nature of the aqueous system and the operating conditions under which the foaming takes place. In most instances, it is not necessary to use more than 700 parts by weight of the antifoam composition per million parts of aqueous solution. In many instances, as little as 1 part per million may be effective, while in the case of very strong foamers, as much as 5,000 parts per million may be required. In any case, th optimum concentration for a particular application can be readily determined by a preliminary test.

The following examples are illustrative only and should not be construed as limiting the invention which is properly delineated in the appended claims. The sulfur-containing homopolymers useful for preparing these copolymers are disclosed in the Ryan application and Bailey patent, supra.

*Example 1*

Dimethylsiloxane fluid endblocked with trimethylsilyl units (15 g., 0.2 mol) was heated and stirred with a siloxane of the unit formula

(3.0 g., .017 mol) until a cloudy gum formed. An additional 182 g., (2.5 mols) of the dimethylsiloxane fluid was added and the reaction mass further heated until a hazy fluid formed. The solution was neutralized with ammonia vapors. The copolymer was then heated in a steam bath to remove the excess ammonia. The product obtained is a copolymeric siloxane containing 99.3 mol percent dimethylsiloxane units and 0.7 mol percent

units.

This copolymer was divided into 4 parts. A portion of this copolymer (1 part by weight) was mixed with 99 parts of a 350 cps. dimethylsiloxane fluid and 4 parts by weight of a finely divided silica areogel. This product was labeled Sample A. Sample B is composed of 10 parts by weight of the above copolymer, 90 parts of a 350 cps. dimethylsiloxane fluid and 4 parts of a finely divided silica aerogel. Sample C is composed of 40 parts of the above copolymer, 60 parts of a 350 cps. dimethylsiloxane fluid and 4 parts of a finely divided silica aerogel. Sample D is cmposed of 100 parts of the above copolymer and 4 parts of a finely divided silica aerogel.

*Example 2*

Cyclic dimethylsiloxane (100 g., 1.35 mols), hexamethyldisiloxane (0.7 g., 0.004 mol) and

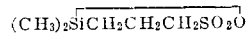

(1.8 g., 0.01 mol) were heated and stirred together until the reaction mass became clear. Water (4 drops) was then added and the heating and stirring continued until the material became viscous. The reaction mass was then neutralized with ammonia vapors. The product obtained is a copolymeric siloxane containing 99.3 mol percent dimethylsiloxane units and 0.7 mol percent

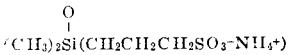

units. The copolymer (40 parts by weight), 60 parts by weight of a 350 cps. dimethylsiloxane fluid and 4 parts by weight of a finely divided silica aerogel were mixed together in a mechanical mixer.

Example 3

A 350 cps. dimethylsiloxane fluid endblocked with trimethylsilyl units (200 g., 2.7 mols) was heated and stirred with a siloxane of the unit formula

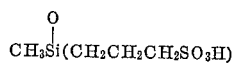

(40 g., 0.22 mol) until a gum had formed. An additional 280 g. (3.8 mols) of the dimethylsiloxane fluid and 280 g. (3.8 mols) of cyclic dimethylsiloxane were added to the reaction mass. The reaction mass was stirred and heated until a gum formed which was dissolved in 200 ml. of isopropanol. The solution was neutralized by adding 170 ml. of 5 percent sodium hydroxide. The solvent The antifoaming efficiency of Sample A is tested by shaking 100 g. of a 0.1 percent aqueous solution of sodium dodecyldiphenyl oxide disulfonate in an 8 oz. bottle 10 times and then estimating the foam volume. The efficiency of Sample A is measured at various concentrations of Sample A (expressed in parts per million based upon the weight of the aqueous solution) and at various pH values. The foam volumes set forth in Table I are expressed as a percentage of the original liquid volume and are determined 60 seconds after the shaking has stopped. The first figure appearing in each column under the various intervals at which the material was tested is foam volume. The second figure is the number of seconds required for the foam to collapse.

TABLE I

| | Antifoam Composition | pH | Concentration (p.p.m.) | Time in Days | | | | | | | | | |
|---|---|---|---|---|---|---|---|---|---|---|---|---|---|
| | | | | 0 | | 3 | | 7 | | 18 | | 54 | |
| | | | | Foam Volume | Time | Foam Volume | Time | Foam Volume | Time | Foam Volume | Time | Foam Volume | Time |
| 1 | Sample A | 1.2 | 33.3 | 30 | 9 | 50 | 60 | 100 | 60 | 100 | 60 | 100 | 60 |
| 2 | do | 7 | 40 | 20 | 60 | 30 | 60 | 40 | 60 | 40 | 60 | 45 | 60 |
| 3 | do | 12 | 40 | 20 | 60 | 40 | 60 | 30 | 60 | 30 | 60 | 40 | 60 | was evaporated on a steam bath overnight and then in a vacuum oven. The product was a copolymeric siloxane containing 97.9 mol percent dimethylsiloxane units and 2.1 mol percent

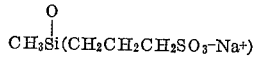

units. This copolymer was divided into two portions. A portion of this copolymer (40 parts by weight), 60 parts by weight of a 350 cps. dimethylsiloxane fluid and 4 parts by weight of a finely divided silica aerogel were mixed together in a mechanical mixer. The product obtained was labeled Sample A.

Another portion of this copolymer (40 parts by weight), 90 parts by weight of a 350 cps. dimethylsiloxane fluid and 4 parts by weight of a finely divided silica aerogel were mixed together in a mechanical mixer. The product obtained was labeled Sample B.

Example 4

A 350 cps. dimethylsiloxane fluid endblocked with trimethylsilyl units (6.0 g., .08 mol) and a siloxane of the unit formula

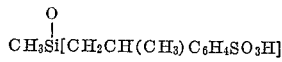

(2 g., 0.0077 mol) were heated and stirred together until they became homogeneous. An additional 50 g. (0.68 mol) of the dimethylsiloxane fluid and 250 g. (2.38 mol) of a cyclic dimethylsiloxane were then added. The reaction mass was then heated and stirred at 125° C. (mantle temperature) until it became clear. A copolymer containing 99.8 mol percent dimethylsiloxane units and 0.2 mol percent siloxane units of the unit formula

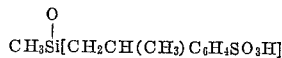

was obtained. This copolymer was divided into three portions.

A portion of this copolymer (40 parts by weight), 60 parts by weight of a 350 cps. dimethylsiloxane fluid and 4 parts by weight of a finely divided silica aerogel were mixed together in a mechanical mixer. The product obtained was labeled Sample A.

Another portion of this copolymeric siloxane was mixed with 2 g. of aqueous ammonium hydroxide. The product was heated on a steam bath for several hours and then dried in an evaporating dish. This copolymer (40 parts by weight) was mixed with 60 parts by weight of a 350 cps. dimethylsiloxane fluid and 4 parts by weight of a finely divided silica aerogel. The product obtained was labeled Sample B.

A portion of this copolymeric siloxane (100 parts by weight) was mixed with 4 parts of a finely divided silica aerogel in a mechanical mixer. The product obtained was labeled Sample C.

Example 5

A 350 cps. dimethylsiloxane fluid endblocked with trimethylsilyl units (30.8 g., .42 mol) and a siloxane of the unit formula

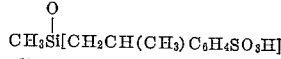

(10.0 g., .04 mol) were heated and stirred together until they became homogeneous. An additional 54.2 g. (.73 mol) of the dimethylsiloxane fluid and 105 g. (1.4 mols) of a cyclic dimethylsiloxane was then added. The heating and stirring were continued until a viscous homogeneous material was obtained. Sufficient isopropanol (70 g.) was added to produce a clear solution. The reaction mass was then heated for 30 minutes and neutralized with 15 ml. of 11.1 percent sodium hydroxide in 50 percent ethanol. The solvent was then evaporated and the product dried in a vacuum oven overnight. The copolymer contained 98.5 mol percent dimethylsiloxane units and 1.5 mol percent siloxane units of the formula

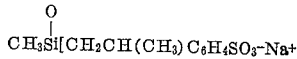

This copolymer (40 parts by weight) was mixed with 60 parts by weight of a 350 cps. dimethylsiloxane fluid and 4 parts by weight of a finely divided silica aerogel.

Example 6

A dimethylsiloxane fluid (30 g., .41 mol) and a siloxane of the unit formula

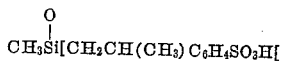

(6 g., .022 mol) were stirred and heated until homogeneous. An additional 75 g. (1 mol) of dimethylsiloxane fluid and 189 g. (2.6 mols) of cyclic dimethylsiloxane was then added and then heating continued until a clear viscous material resulted. The material was neutralized with 11 percent sodium hydroxide in 50 percent ethanol and 80 g. of isopropanol was added. The solvent was then evaporated and the material placed in a vacuum oven overnight. The product obtained was a copolymeric siloxane containing .6 mol percent

units and 99.4 mol percent $(CH_3)_2SiO$ units. This copolymer (40 parts by weight) was mixed with 60 parts by weight of a 350 cps. dimethylsiloxane fluid and 4 parts by weight of a silica aerogel.

Example 7

A cyclic dimethylsiloxane (9.8 g., 0.13 mol) and a siloxane of the unit formula

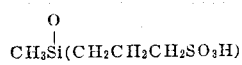

(0.15 g., .0008 mol) were mixed together and heated in a steam oven. The reaction mass was then dissolved in 4 ml. of toluene and 1 ml. of isopropanol. The solution was then divided into two portions. In one portion the solvents were then evaporated on a steam bath. A copolymeric siloxane containing 99.4 mol percent dimethylsiloxane units and 0.6 mol percent of

units was obtained. This copolymer (2 g.) was mixed with 3 g. of a 350 cps. dimethylsiloxane fluid and 0.2 g. of a finely divided silica aerogel. This product was labeled Sample A.

The second portion of the solution was neutralized with ammonia vapors. The solvents were then evaporated. A copolymeric siloxane containing 99.4 mol percent dimethylsiloxane units and 0.6 mol percent of

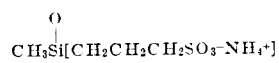

units was obtained. This copolymer (2 g.) was then mixed with 3 g. of a 350 cps. dimethylsiloxane fluid and 0.2 g. of a finely divided silica aerogel. This product was labeled Sample B.

Example 8

A mixture of 50 cps. methylhydrogensiloxane fluid (41.9 g.) endblocked with trimethylsilyl units, dimethyl cyclic trimers and tetramers (41.9 g.), a siloxane of the unit formula

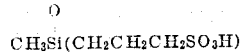

(6.3 g.) and 50 ml. of isopropanol was heated at a temperature slightly below the reflux temperature until a clear solution formed. Ammonia vapors were then bubbled through the copolymer and the isopropanol was evaporated. A copolymer consisting of 31 mol percent units of the formula $(CH_3)_2SiO$, 67 mol percent units of the formula $CH_3SiH(CH_3)HSiO$ and 2 mol percent units of the formula

was obtained.

The above copolymer (2 g.) was mixed with a 350 cps. dimethylsiloxane fluid (3 g.) and 0.2 g. of a finely divided silica filler.

Example 9

The above copolymer (2 g.) was mixed with a 350 cps. foam compositions made in the preceding examples are set forth in Table II. The defoaming efficiencies of these materials were evaluated by bubbling air from a glass air disperser at a rate of 600 cc. per minute through 100 ml. of the foaming solution in an 8-ounce wide mouth bottle until the foam reaches the top of the bottle. The air disperser is then removed and a drop of the antifoam composition is placed on the foam. The time in seconds required for the foam to collapse is a measure of the defoaming ability of the composition. This value is set forth in Table II under the column headed "Defoam." The bottle is then capped and the bottle is shaken 10 times. The time, in seconds, for the foam to collapse is considered to be a measure of antifoaming efficiency. This value is set forth under "Antifoam." The results of these tests are shown in the following Table II. In each case, the foaming aqueous solution contains 0.1 percent by weight of the material listed in Table II.

TABLE II

| | Antifoam Material | Collapse Times | | | | | |
|---|---|---|---|---|---|---|---|
| | | Polyoxyethylene sorbitan monooleate | | Octylphenyl-polyethoxy ethanol | | Dodecylbenzene sodium sulfonate | |
| | | Defoam | Antifoam | Defoam | Antifoam | Defoam | Antifoam |
| 1 | Sample A of Ex. 1 | | | >720 | 1 | | |
| 2 | Sample B of Ex. 1 | 110 | 1 | | | | |
| 3 | Sample C of Ex. 1 | 75 | 0 | 68 | 1 | 255 | 12 |
| 4 | Sample D of Ex. 1 | 129 | 3 | | | | |
| 5 | Example 2 | | | | | >300 | >300 |
| 6 | Sample A of Ex. 3 | | | | | >300 | 85 |
| 7 | Sample B of Ex. 3 | | | | | >300 | >300 |
| 8 | Sample A of Ex. 4 | 50 | | 100 | 1 | | |
| 9 | Example 5 | 130 | | | | | |
| 10 | Example 6 | 185 | | | | | |
| 11 | Sample A of Ex. 7 | 62 | | | | | |
| 12 | Sample B of Ex. 7 | 85 | 2 | | | | |
| 13 | Sample B of Ex. 4 | 74 | | | | | |
| 14 | Sample C of Ex. 4 | 65 | | | | | |
| 15 | Example 8 | 130 | 1 | | | | |

Example 10

When the following copolymers are mixed with the following fillers and methylpolysiloxane fluids, a composition which reduces and prevents foaming in aqueous solutions is obtained. Salts of these copolymers are prepared by the reaction of the copolymer with ammonium or alkali metal hydroxides. All percentages are based upon the total weight of the composition.

TABLE III

| | Copolymer | Filler | Percent by wt. of dimethylsiloxane fluid |
|---|---|---|---|
| 1 | 10% by wt. of a copolymer composed of 98 mol percent units of the formula $(CH_3)_2SiO$ and 2 mol percent $(CH_3)_2\overset{O}{\underset{\|}{Si}}{}^{.5}[(CH_2)_4SO_3H]$. | 10% by wt. of a finely divided aerogel. | 80 |
| 2 | 40% by wt. of a copolymer composed of 99.96 mol percent units of the formula $(CH_3)_2SiO$ and .04 mol percent $(CH_3)\overset{O}{\underset{\|}{Si}}[-CH\underset{CH_2}{\overset{CH_2}{\diagup\diagdown}}CH_2SO_3{}^-NH_4{}^+]$. | 4% by wt. of a finely divided silica. | 56 |
| 3 | 70% by wt. of a copolymer composed of 97 mol percent units of the formula $(CH_3)_2SiO$ and 3 mol percent $(CH_3)\overset{O}{\underset{\|}{Si}}[(CH_2)_{30}SO_3{}^-K^+]$. | 3% by wt. of a finely divided silica. | 27 |
| 4 | 40% by wt. of a copolymer composed of 97 mol percent units of the formula $(CH_3)_2SiO$ and 3 mol percent $\overset{O}{\underset{\|}{Si}}{}^{.5}(CH_2CH_2CH_2SO_3H)$. | 4% by wt. of a finely divided silica. | 56 |
| 5 | 40% by wt. of a copolymer composed of 97 mol percent units of the formula $(CH_3)_2SiO$ and 3 mol percent $\overset{O}{\underset{\|}{Si}}{}^{.5}(CH_2CH_2CH_2SO_3H)_3$. | ---do--- | 56 |
| 6 | 40% by wt. of a copolymer composed of 97 mol percent units of the formula $(CH_3)_2SiO$ and 3 mol percent $CH_3\overset{O}{\underset{\|}{Si}}[CH_2CH_2C_6H_4SO_3{}^-NH_4{}^+]$. | 4% by wt. of a finely divided carbon black. | 56 |
| 7 | 40% by wt. of a copolymer composed of 97 mol percent units of the formula $(CH_3)_2SiO$ and 3 mol percent $(HO_3SC_{10}H_6CH_2CH_2)\overset{O}{\underset{\|}{Si}}(CH_3)$. | 2% by wt. of a finely divided silica. | 58 |

That which is claimed is:

1. An antifoam composition comprising an intimate admixture of
   (1) a sulfur-containing siloxane copolymer containing an average of from 1.75 to 2.1 organic radicals per silicon atom, said copolymer consisting essentially of
      (A) from 0.04 to 3.0 mol percent units of the formula $$(MO_3SR-)_a\underset{\underset{\tfrac{4-a-b}{2}}{}}{\overset{(CH_3)_b}{\underset{\|}{Si}}}O$$

wherein M is selected from the group consisting of $NH_4{}^+$ ions, alkali metal and hydrogen atoms, R is a divalent hydrocarbon radical selected from the group consisting of alkylene radicals containing from 2 to 30 inclusive carbon atoms, cycloalkylene radicals containing from 4 to 18 inclusive carbon atoms and aralkylene radicals containing from 7 to 18 inclusive carbon atoms, wherein the sulfur atom is attached to the carbon atom in R which is at least the second carbon atom away from the silicon atom, $a$ has an average value of from 1 to 3 inclusive, $b$ has an average value of from 0 to 2 inclusive and the total average value of $a+b$ is from 1 to 3 inclusive, and
      (B) from 97.0 to 99.96 mol percent siloxane units of formula $$(CH_3)_c\underset{\underset{\tfrac{4-c-d}{2}}{}}{\overset{(H)_d}{\underset{\|}{Si}}}O$$

wherein $c$ has an average value of from 1 to 2.1 inclusive, $d$ has an average value of from 0 to 1 inclusive and the total value of $c+d$ is from 1.75 to 2.1 inclusive, and
   (2) a finely divided filler selected from the group consisting of silica and carbon black,
   there being, based on the total weight of the composition, from 90 to 99 percent by weight of (1) and from 1 to 10 percent by weight of (2).

2. A method of reducing and preventing foaming in aqueous systems which comprises admixing with said aqueous system a minor amount sufficient to inhibit foam of the composition of claim 1.

3. An antifoam composition comprising an intimate admixture of
   (1) a sulfur-containing siloxane copolymer containing an average of from 1.75 to 2.1 organic radicals per silicon atom, said copolymer consisting essentially of
      (A) from 0.04 to 3.0 mol percent units of the formula $$(MO_3SR-)_a\underset{\underset{\tfrac{4-a-b}{2}}{}}{\overset{(CH_3)_b}{\underset{\|}{Si}}}O$$

wherein M is selected from the group consisting of $NH_4{}^+$ ions, alkali metal and hydrogen atoms, R is a divalent hydrocarbon radical selected from the group consisting of alkylene radicals containing from 2 to 30 inclusive carbon atoms, cycloalkylene radicals containing from 4 to 18 inclusive carbon atoms and aralkylene radicals containing from 7 to 18 inclusive carbon atoms, wherein the sulfur atom is attached to the carbon atom in R which is at least the second carbon atom away from the silicon atom, $a$ has an average value of from 1 to 3 inclusive, $b$ has an average value of from 0 to 2 inclusive and the total average value of $a+b$ is from 1 to 3 inclusive, and (B) from 97.0 to 99.96 mol percent siloxane units of the formula

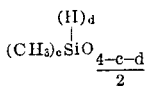

wherein $c$ has an average value of from 1 to 2.1 inclusive, $d$ has an average value of from 0 to 1 inclusive and the total value of $c+d$ is from 1.75 to 2.1 inclusive, and (2) a finely divided filler selected from the group consisting of silica and carbon black, and (3) a fluid methylpolysiloxane, there being, based on the total weight of the composition, from 1 to 80 percent by weight of (1), from 1 to 10 percent by weight of (2) and from 10 to 98 percent by weight of (3).

4. The antifoam composition of claim 3 wherein $a$ has an average value of 1, $b$ has an average value of from 1 to 2 inclusive, $c$ has an average value of from 1.95 to 2.05, $d$ has a value of 0, there being, based upon the weight of the total composition, from 2 to 70 percent by weight of (1), 2 to 6 percent by weight of (2) and 28 to 96 percent by weight of (3), and the sulfur-containing siloxane copolymer (1) consists essentially of 0.4 to 3.0 mol percent of (A) units and from 97.0 to 99.6 mol percent of (B) units.

5. A method of reducing and preventing foaming in aqueous systems which comprises admixing with said aqueous system a minor amount sufficient to inhibit foam of the composition of claim 3.

6. An antifoam composition comprising an intimate admixture of (1) a sulfur-containing siloxane copolymer consisting essentially of (A) from 0.04 to 3.0 mol percent units of the formula

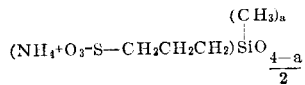

wherein $a$ has a value of from 1 to 2 inclusive, (B) from 97.0 to 99.96 mol percent siloxane units of the formula $(CH_3)_cSiO$ wherein $c$ has an average value of from 1.95 to 2.05, (2) an untreated finely divided silica filler, and (3) a fluid methylpolysiloxane, there being, based upon the weight of the total composition, from 1 to 80 percent by weight of (1), from 1 to 10 percent by weight of (2) and from 10 to 98 percent by weight of (3).

7. The antifoam composition of claim 6 wherein there is, based upon the weight of the total composition, from 2 to 70 percent by weight of (1), from 2 to 6 percent of (2) and from 28 to 96 percent by weight of (3) and the sulfur-containing siloxane copolymer (1) consists essentially of from 0.4 to 3.0 mol percent of (A) units and from 97.0 to 99.6 mol percent of (B) units.

8. A method of reducing and preventing foaming in aqueous systems which comprises admixing with said aqueous system a minor amount sufficient to inhibit foam of the composition of claim 6.

9. An antifoam composition comprising an intimate admixture of (1) a sulfur-containing siloxane copolymer consisting essentially of (A) from 0.04 to 3.0 mol percent units of the formula

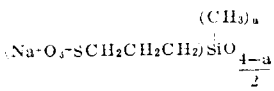

wherein $a$ has a value of from 1 to 2 inclusive, (B) from 97.0 to 99.96 mol percent siloxane units of the formula $(CH_3)_cSiO$ wherein $c$ has an average value of from 1.95 to 2.05, (2) an untreated finely divided silica filler, and (3) a fluid methylpolysiloxane, there being, based upon the weight of the total composition, from 1 to 80 percent by weight of (1), from 1 to 10 percent by weight of (2) and from 10 to 98 percent by weight of (3).

10. The antifoam composition of claim 9 wherein there is, based upon the weight of the total composition, from 2 to 70 percent by weight of (1), from 2 to 6 percent of (2) and from 28 to 96 percent by weight of (3) and the sulfur-containing siloxane copolymer consists essentially of from 0.4 to 3.0 mol percent of (A) units and from 97.0 to 99.6 mol percent of (B) units.

11. A method of reducing and preventing foaming in aqueous systems which comprises admixing with said aqueous system a minor amount sufficient to inhibit foam of the composition of claim 9.

12. An antifoam composition comprising an intimate admixture of (1) a sulfur-containing siloxane copolymer consisting essentially of (A) from 0.04 to 3.0 mol percent units of the formula

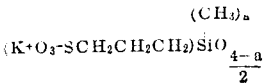

wherein $a$ has a value of from 1 to 2 inclusive, (B) from 97.0 to 99.96 mol percent siloxane units of the formula $(CH_3)_cSiO$, wherein $c$ has an average value of from 1.95 to 2.05, (2) an untreated finely divided silica filler, and (3) a fluid methylpolysiloxane, there being, based upon the weight of the total composition, from 1 to 80 percent by weight of (1), from 1 to 10 percent by weight of (2) and from 10 to 98 percent by weight of (3).

13. The antifoam composition of claim 12 wherein there is, based upon the weight of the total composition, from 2 to 70 percent by weight of (1), from 2 to 6 percent of (2) and from 28 to 96 percent by weight of (3) and the sulfur-containing siloxane copolymer (1) consists essentially of from 0.04 to 3.0 mol percent of (A) units and from 97.0 to 99.6 mol percent of (B) units.

14. A method of reducing and preventing foaming in aqueous systems which comprises admixing with said aqueous system a minor amount sufficient to inhibit foam of the composition of claim 12.

15. An antifoam composition comprising an intimate admixture of (1) a sulfur-containing siloxane copolymer consisting essentially of (A) from 0.04 to 3.0 mol percent units of the formula

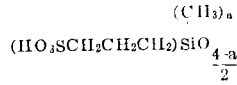

wherein $a$ has a value of from 1 to 2 inclusive, (B) from 97.0 to 99.96 mol percent siloxane units of the formula $(CH_3)_cSiO$, wherein $c$ has an average value of from 1.95 to 2.05, (2) an untreated finely divided silica filler, and
(3) a fluid methylpolysiloxane,
there being, based upon the weight of the total composition, from 1 to 80 percent by weight of (1), from 1 to 10 percent by weight of (2) and from 10 to 98 percent by weight of (3).

16. The composition of claim 15 wherein there is, based upon the weight of the total composition, from 2 to 70 percent by weight of (1), from 2 to 6 percent of (2) and from 28 to 96 percent by weight of (3) and the sulfur-containing siloxane copolymer (1) consists essentially of from 0.4 to 3.0 mol percent of (A) units and from 97.0 to 99.6 mol percent of (B) units, 17. A method of reducing and preventing foaming in aqueous systems which comprises admixing with said aqueous system a minor amount sufficient to inhibit foam of the composition of claim 15.

References Cited

UNITED STATES PATENTS

| | | | |
|---|---|---|---|
| 2,702,793 | 2/1955 | Smith | 252—321 X |
| 2,829,112 | 4/1958 | Solomon | 252—358 |
| 2,894,913 | 7/1959 | Sullivan et al. | 252—358 |
| 2,968,643 | 1/1961 | Bailey | 260—46.5 |
| 3,215,718 | 11/1965 | Ryan | 260—46.5 |

LEON D. ROSDOL, *Primary Examiner.*

R. D. LOVERING, *Examiner.*